US007219343B2

(12) United States Patent
Almeida et al.

(10) Patent No.: US 7,219,343 B2
(45) Date of Patent: May 15, 2007

(54) FIRMWARE UPDATE MECHANISM IN A MULTI-NODE DATA PROCESSING SYSTEM

(75) Inventors: Jason Robert Almeida, Raleigh, NC (US); Gregg Kent Gibson, Apex, NC (US); Edward Joseph Klodnicki, Durham, NC (US); Willie James Nathan, Jr., Durham, NC (US); William Bradley Schwartz, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 830 days.

(21) Appl. No.: 10/411,554

(22) Filed: Apr. 10, 2003

(65) Prior Publication Data

US 2004/0205779 A1   Oct. 14, 2004

(51) Int. Cl.
*G06F 9/44* (2006.01)
*G06F 15/167* (2006.01)

(52) U.S. Cl. ...................... 717/172; 709/215
(58) Field of Classification Search ............. 717/168, 717/171, 172; 709/215; 719/312; 712/13, 712/28–31
See application file for complete search history.

(56) References Cited

U.S. PATENT DOCUMENTS

| 5,961,642 | A | 10/1999 | Lewis |
| 6,009,524 | A * | 12/1999 | Olarig et al. ................. 726/10 |
| 6,349,304 | B1 | 2/2002 | Boldt et al. |
| 6,385,668 | B1 | 5/2002 | Gaddess et al. |
| 6,463,528 | B1 | 10/2002 | Rajakarunanayake et al. |
| 6,684,343 | B1 * | 1/2004 | Bouchier et al. ............... 714/4 |
| 6,934,873 | B2 * | 8/2005 | Lu et al. ......................... 714/2 |
| 7,000,101 | B2 * | 2/2006 | Wu et al. ........................ 713/1 |
| 2002/0073304 | A1 | 6/2002 | Marsh et al. |
| 2002/0091807 | A1 | 7/2002 | Goodman |
| 2002/0092008 | A1 | 7/2002 | Kehne et al. |
| 2004/0186988 | A1 * | 9/2004 | Polyudov ..................... 713/100 |

FOREIGN PATENT DOCUMENTS

EP   0 687 975 B1   4/1999

OTHER PUBLICATIONS

"Service Processor Installation and User's Guide," Nov. 1996, IBM, $2^{nd}$ ed., pp. i-xii, "1-1" through "X-3".*

* cited by examiner

*Primary Examiner*—Tuan Dam
*Assistant Examiner*—Eric B. Kiss
(74) *Attorney, Agent, or Firm*—John Biggers; Cynthia S. Byrd; Biggers & Ohanian, LLP

(57) ABSTRACT

Updating firmware on multiple systems or nodes within a merged networked environment includes providing firmware update code and a firmware update utility to a primary node. The firmware update utility determines the presence of a multi-node partition and detects the partition's configuration. The configuration determination includes determining the location of a remote service processor on each secondary node. The primary node creates an image of the firmware update code and distributes the created image to each of the secondary node service processors over a sideband link. Each of the remote service processors would then restart their respective systems. The node's BIOS detects the presence of the firmware update code on the service processor and forces the node to boot the update code directly. After the firmware update is complete, the firmware update code is deleted. When it subsequent restart occurs, the nodes will boot to the merged state.

20 Claims, 3 Drawing Sheets

FIRMWARE UPDATE MECHANISM IN A MULTI-NODE DATA PROCESSING SYSTEM

BACKGROUND

1. Field of the Present Invention

The present invention generally relates to the field of data processing systems and more particularly to a method and system for updating system firmware on multiple, interconnected systems.

2. History of Related Art

In the field of data processing systems generally and networked data processing systems in particular, updating the firmware of one or more systems is typically a manually intensive procedure. Traditionally, firmware updates have been achieved by inserting a computer readable medium (such as a diskette or CD) into an appropriate drive and restarting the system. The medium includes codes that, when executed as part of the system boot procedure, will reprogram some or all of the system's firmware. In a traditional networked environment, firmware updating is made more difficult because the number of systems increases. Even more significantly, in many network environments, it may not be appropriate to assume that all systems have a bootable drive that can accept the firmware update medium. In such environments, network-wide firmware update would have to include a method of updating firmware via the network or, even less desirably, a manual process in which a drive, keyboard, and monitor are temporarily attached to each system for purposes of performing the firmware update.

In some environments, the firmware update problem is still further complicated by the architecture of the network. As an example, some multi-system networks employ an architecture that effectively merges the resources of multiple systems into a single multi-system partition. In a merged environment, the firmware modules of the individual systems may be effectively hidden or inaccessible such that, even if a remote firmware update procedure were available, they could not be applied to systems within the partition that are invisible to the network. Accordingly, it would be desirable to implement a procedure and mechanism for updating firmware in a multi-system environment. It would be further desirable if the implemented solution were effective in merged architectures and did not require complete disassembly of the merged environment. It would be still further desirable if the implemented solution did not require significant manual oversight and did not require re-arrangement or reconfiguration of physical resources.

SUMMARY OF THE INVENTION

The problems identified above are in large part addressed by a system and method for updating firmware on multiple systems within a networked environment. In one embodiment, the multiple systems or nodes are connected via a scalability link or network that effectively merges the component systems into an architecturally monolithic system or partition. In this environment, one of the nodes is designated as the primary node or boot node. The primary node typically includes a bootable drive and I/O resources that enables user interaction. Firmware update code and a firmware update utility are provided to the primary node. When the firmware update utility is executed, it first determines the presence of a multi-node partition and detects the partition's configuration including the memory mapped and/or IP addresses of specific resources within the partition. In an embodiment that leverages the functionality of a service processor on each of the nodes, the configuration determination includes determining the location of each remote service processor. After determining various configuration parameters associated with the partition, the boot node is responsible for creating an image of the firmware update code and distributing the created image to each of the partition's nodes. In an embodiment that uses service processors, the service processors are interconnected via a network, cable, or other link that is "sideband" with respect to the scalability link merging the partition's nodes. This sideband link may be used to distribute the firmware update code to the service processors on each node. Once the update code is distributed, the boot node would then have each of the service processors restart their respective systems. During the restart, the node's BIOS would detect the presence of the firmware update code and force the node to boot the update code directly. After the firmware update is complete, the firmware update code is deleted. When a subsequent restart occurs, the absence of the bootable image on the individual nodes will result in the partition booting to its partitioned state. Thus, firmware updating is achieved on the individual nodes while maintaining the partitioned configuration.

BRIEF DESCRIPTION OF THE DRAWINGS

Other objects and advantages of the invention will become apparent upon reading the following detailed description and upon reference to the accompanying drawings in which.

Figure 1:
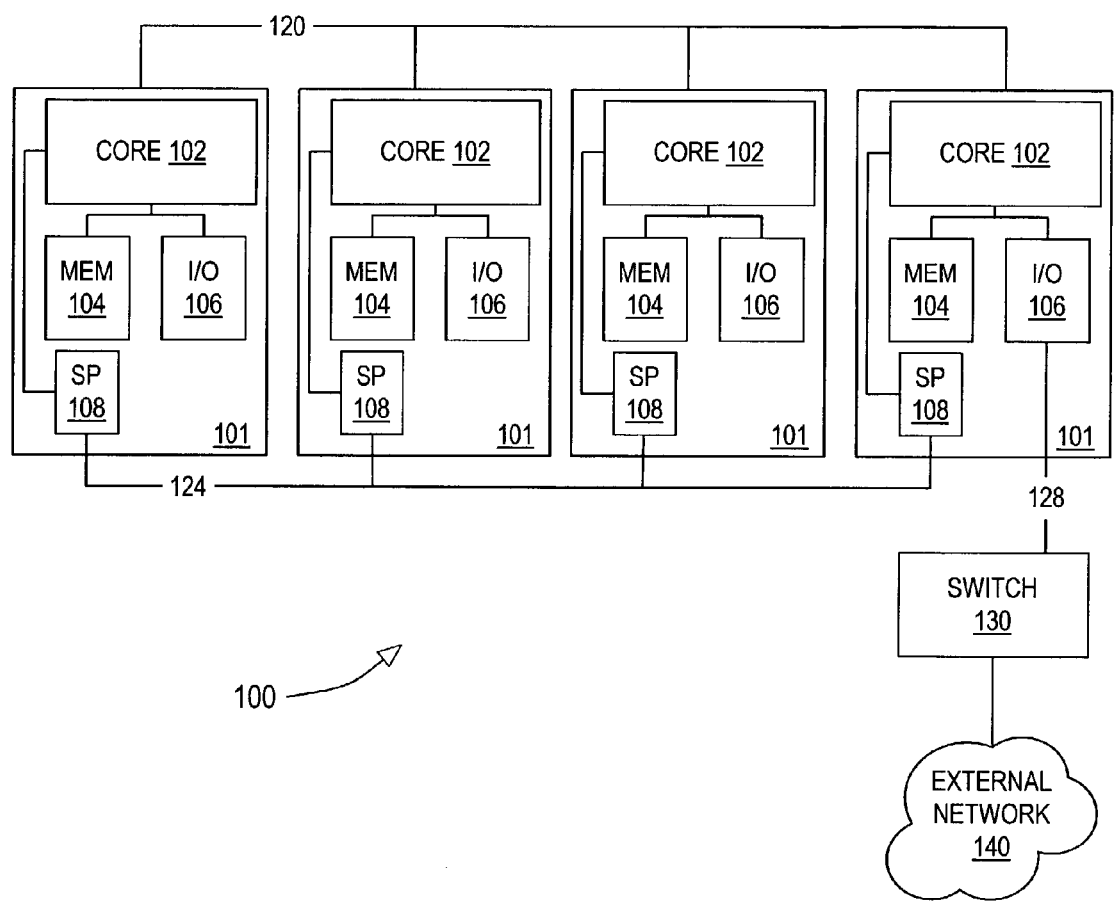
FIG. 1 is a block diagram of selected elements of a data processing network suitable for implementing one embodiment of the present invention.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF THE INVENTION

Generally speaking, the invention contemplates updating firmware uniformly across multiple nodes in a data processing network. A primary node receives firmware update code, creates a bootable image of the firmware update code, and distributes the bootable image to the other nodes. The primary node then forces a restart of the remote nodes. When these remote nodes are restarted, the bootable image is executed to reprogram or otherwise update the appropriate firmware. Following firmware updating, the bootable image is removed from the remote nodes such that, during a subsequent reset, a partitioned environment that was configured prior to the firmware updating is reinstated.

Turning now to the drawings, FIG. 1 illustrates selected elements of a data processing system 100 suitable for use with the present invention. In the depicted embodiment, system 100 (also referred to in this disclosure as partition 100) includes a set of four interconnected nodes 101. Each node 101 has its own chassis and includes a central processing core 102, system memory 104, and I/O devices collectively represented in FIG. 1 by reference numeral 106. Each core 102 may include multiple microprocessor devices that share the system memory 104 such that each node 101 is a suitable for use as a symmetrical multiprocessor (SMP) system. I/O 106 includes, for example, any fixed or direct access storage device (DASD) the node may include. The core 102, system memory 104, and I/O 106 may be implemented as a scalable server system such as, for example, the XSERIES x440 server from IBM Corporation. In one particular embodiment that illustrates the scalability of system 100, each node 101 includes a core 102 with four x86-type microprocessors. In this implementation, four nodes 101 can be merged to form a 16-way SMP system or partition that enjoys the benefits of combined resources while overcoming limitations (such as system bus bandwidth) that limit the scalability of conventional (i.e., single node) SMP configurations.

Each node 101 as depicted in FIG. 1 includes service processor facilities 108. In an embodiment that facilitates distributed and automated firmware updates according to the present invention, service processor 108 includes remote supervisory facilities. These facilities enable functionality including graphical console redirection, keyboard and mouse control, remote management independent of the server status, and remote control of hardware and operating systems. Most beneficially with respect to the present application, service processor 108 enables remote update of the server's firmware (including the firmware of the supervisory facilities themselves). In one embodiment, service processor 108 is implemented as an adapter that is connected via a PCI or other suitable I/O bus. An example of this type of service processor facility is the Remote Supervisory Adapter (RSA) from IBM Corporation.

In the scalable partition embodiment referred to above, system 100 is implemented in a merged resource configuration. In this configuration, the processing, memory, and I/O resources of each individual node 101 are shared by the system 100 as a whole to achieve scalable performance. Individual nodes 101 are interconnected with a scalability link 120 that makes the processing, memory, and I/O resources of each node available to the system 100 under a single operating system image. Scalability link 120 is a bi-directional high speed link that connects the system busses of each node 101. In the merged resource configuration, system 100 is sometimes referred to as a partition 100. For purposes of this disclosure, a partition is a multi-node system configuration operating under a single operating system image. The multiple physical nodes of the partition are transparent to application programs. In a partition configuration, some conventional I/O resources on some of the nodes may be eliminated. In one embodiment, for example, only one node of the partition requires and includes a keyboard, display monitor, mouse, and removable media disk drive.

Once a system is configured as a merged-resource partition, the entire partition is booted as a single unit following a reset. When a reset occurs on any of the individual nodes 101, a partition boot sequence is executed. In this sequence, each individual node 101 executes a portion of its own boot program before deferring control to the partition sequence. Following a reset, each node 101 would, as an example, turn on its internal power supplies and perform its system BIOS including its power on self test (POST). The individual node boot sequences would then collectively defer to a designated primary node or boot node that would determine what system resources are present and configure the resources as a single group of resources that is available to application programs.

While the partition boot sequence beneficially boots the system into the merged state with little or no user intervention (subsequent to an initial configuration procedure), it also has the effect of making resources on the individual machines more difficult to access directly when desired. In particular, the firmware resident on the individual nodes is essentially hidden from the user after the partitioned system is booted because there may be no addressing method to individually identify the firmware resource of the secondary nodes. As an example, if the operating system limits the memory mapped I/O space to a single address space, it may be difficult or impossible to address the firmware modules on individual nodes directly after the partition operating system space is configured.

The present invention enables the continued use of the collective boot sequence and partition system configuration that is desirable in the scalable system, it offers a mechanism for updating system firmware when the need arises. While this may be a relatively infrequent event, the ability to install firmware updates on individual nodes in a clustered system without having to reconfigure the system as a set of individual nodes is highly desirable. In the absence of the disclosed mechanism, a system-wide firmware update would require a technician or other user to configure each machine individually by, for example, attaching appropriate I/O devices including a monitor, keyboard, mouse, and a bootable disk drive to each node, inserting a bootable diskette containing the flash updated module to the machine and so forth.

Returning now to FIG. 1, service processors 108 of each node 101 communicate with each other via a link 124 that is sideband with respect to scalability link 120. In one embodiment, the service processor link is implemented with a standard serial link such as an RS 232 link. In other embodiments, service processors 108 communicate via a standard 10/100 Ethernet link using IP protocols. In either embodiment, the service processors 108 have their own independent states including their own dedicated system memory and their own power states. Thus, service processors 108 are suitable for tasks including powering a node's main power supply (the power provided to core 102 and memory 104) on and off.

System 100 as depicted is connected to an external network 140 via a connection 128 and switch 130 that connects to a NIC or other suitable interconnection device in the I/O 106 of one of the nodes 101. Connection 128 permits partition 101 access to a larger network such as an enterprise intranet or the internet.

Figure 2:
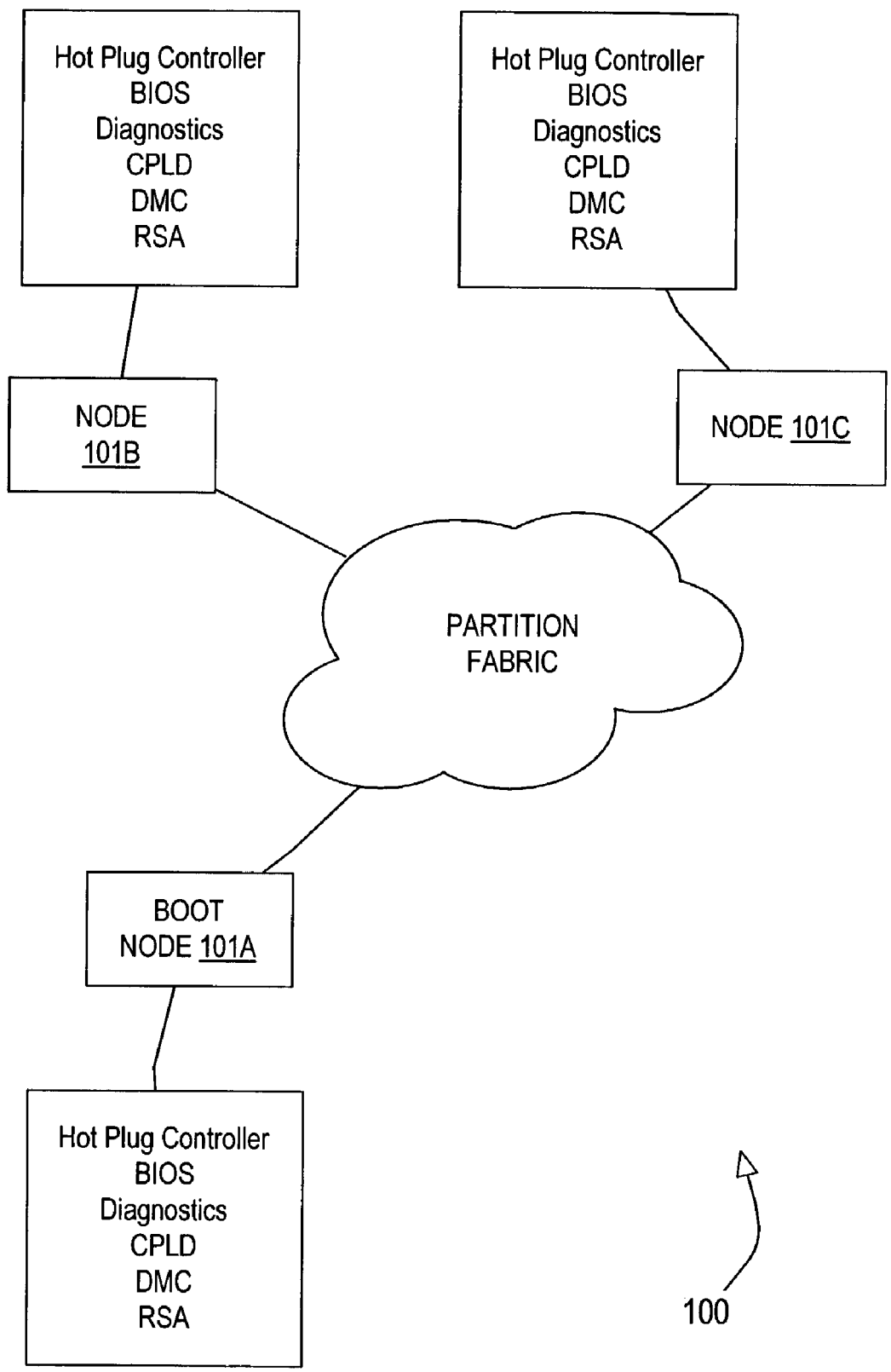
FIG. 2 is a block diagram of selected elements of the data processing network of FIG. 1 emphasizing firmware update features of the present invention.
Figure 3:
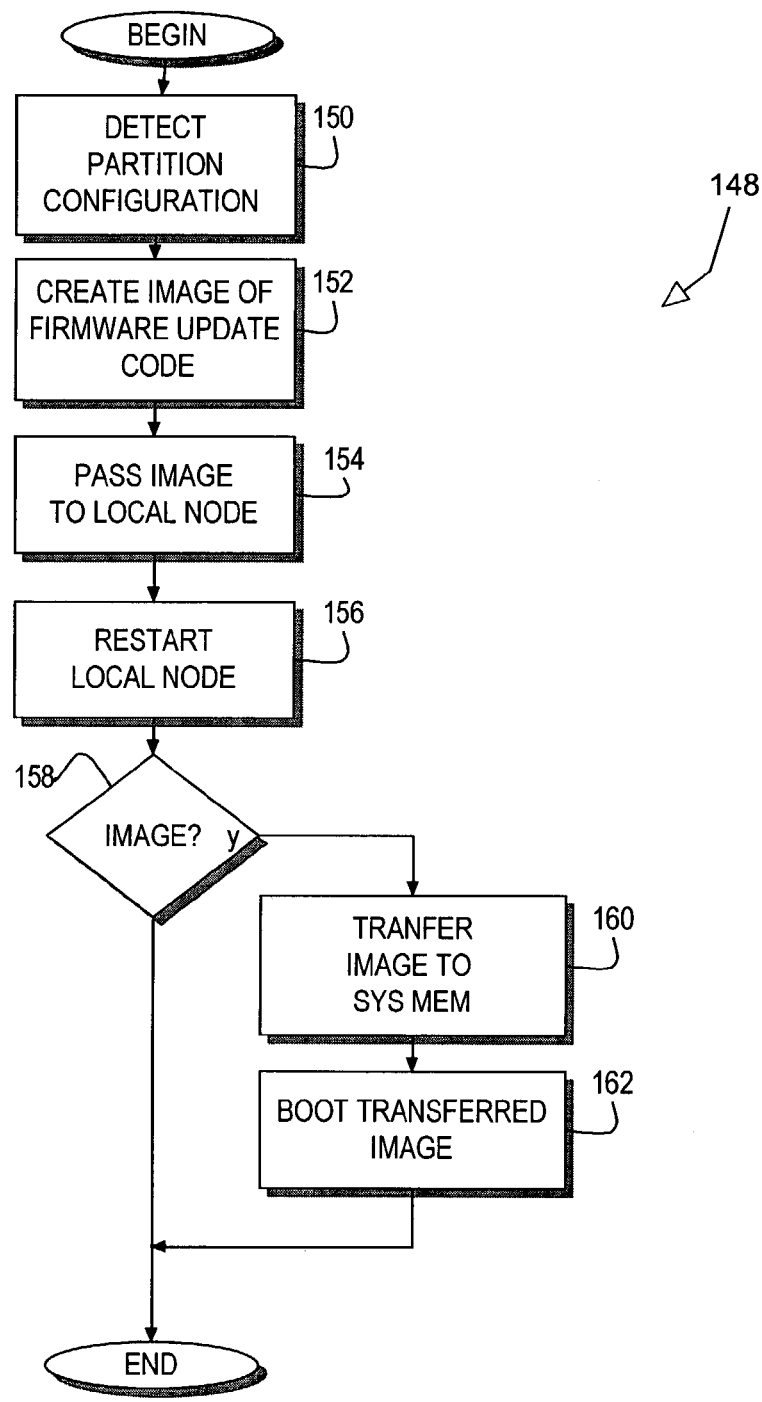
FIG. 3 is a flow diagram illustrating a method of updating firmware across multiple nodes of the network of FIG. 2.

Turning now to FIG. 2 and FIG. 3, a conceptual architectural view and a flow diagram illustrating one embodiment of a method and system for updating firmware across a multi-node system are depicted. The selected elements of system partition 100 depicted in FIG. 2 emphasize the firmware associated with each individual node 101A though 101C. In the case of an XSERIES x440 server from IBM, for example, a node's firmware can include in addition to its BIOS, its hot plug controller, its drawer management controller (DMC), its diagnostic routines, as well as the firmware for the service processor 108 itself. Firmware may be accessed through memory mapped I/O space, an 12C bus, and/or through various other means. Given the complexity of the multiple node architecture and the differences in firmware module access, finding a general solution that can handle all firmware modules is difficult. In one embodiment, the service processor 108 and the node's POST firmware are used to derive a general solution to the firmware update problem.

Portions of the invention are likely implemented as a set of computer executable instructions stored on a computer readable medium (software). In this embodiment, the software may be located within a firmware module of a node 101, stored on a diskette, CD, or other suitable media, stored in a system memory of service processor 108, or a combination thereof.

FIG. 3 is a flow diagram of a method of updating firmware in a multi-node system partition such as partition 100. In one embodiment, the primary boot node 101A is responsible for distributing a bootable image of the desired firmware update to each of the other nodes 101 of system 100. More specifically, the firmware updates are provided to the service processor 108 of each remote node 101B, 101C, etc. The service processor 108 on each local node will reset system power and begin to execute a partition boot sequence. The system BIOS of each node will query the service processor for a remote image. If the service processor responds that it has such an image, the image will be transferred to the node's system memory where it will be booted directly by modifying the fixed disk handler (int 13h, for example) to read from memory.

As depicted in FIG. 3, a method 148 of distributing firmware updates according to one embodiment of the invention includes determining (block 150) the configuration of partition 100. This determination may be performed by executing a utility that is stored on a medium (such as a diskette, CD, or other medium) inserted into a bootable drive of the primary node 101A. In addition to the utility code, the medium also contains the substance of the firmware update although it may be stored in a compressed or other non-executable format to conserve disk space. When any of the nodes 101 is subsequently restarted, the boot sequence will eventually delegate control to the primary. When primary node 101A gets control, the executable code on the medium in the bootable drive is executed and this piece of code determines the system configuration. In one embodiment this determination of configuration is facilitated by the service processors 108, which maintain state regarding the present configuration. This configuration information includes, for example, the number of nodes 101 in the system and an address on link 124 of each remote service processor 108.

After detecting the configuration of system 100, the service processor 108 of primary node 101 creates (block 152) an image of the firmware update code that is stored on the medium and stores the image in its service processor memory (RAM). The firmware update code image that is created by primary node 101A is fully executable code that, if provided to any of the secondary nodes 101B, 101C would be suitable, when executed, for updating the node's firmware. The firmware update code may be stored on the medium in a compressed format and, in this case, the creation of the update code image by primary node 101A includes creating an uncompressed version of the code. The firmware updated code image that is created is then passed to the primary's service processor 108.

After creating the uncompressed firmware update code image, primary node 101A then distributes (block 154) the image to each of the secondary nodes 101B, 101C. In one embodiment, the image is distributed to the service processor 108 of each secondary node. The image may be distributed directly from the system memory of the primary node 101A to the service processors 108 of each of the nodes. Alternatively, the image may be passed to the service processor 108 of the primary node 101A, which would then distributed the image to the remaining service processors. This distribution is facilitated by the service processor link 124 and the configuration information that is detected by the primary's service processor 108. In an Ethernet embodiment of service processor link 124, for example, the primary service processor can transfer the firmware update image to each of the secondary nodes 101B, 101C using standard IP protocols and the IP addresses of each node's service processor 108. The service processor IP addresses are part of the configuration information that is determined when the primary is booted.

After the primary's service processor 108 distributes the firmware update code image to each secondary service processor, each of the secondary service processors restarts (block 156) its corresponding system. Because each service processor maintains its own power and memory state, the firmware update image is unaffected by the restart. Following restart, the BIOS of each secondary node 101B, 101C, will determine (block 158) whether its service processor 108 includes a remote image. If a remote image is not detected, the secondary node BIOS executes as it would normally to boot system 100 to a merged (partition) configuration. If a remote image is detected, however, the secondary node will perform the update indicated by the firmware update image.

In the depicted embodiment, the firmware update is performed by first transferring (block 160) to the system memory 104 of secondary node 101. This transfer is facilitated by direct memory access functionality of service processor 108. Once the firmware update image is transferred to system memory 104, the image is booted (block 162) directly from system memory 104. In one embodiment, this direct update procedure includes modifying an interrupt handler of secondary node 101B, 101C to read from system memory rather than floppy disk or other bootable drive. In this manner, the firmware update of each secondary node on system 100 does not require the presence of a local, bootable drive.

Once the firmware update image is booted, the corresponding firmware update is performed and the secondary systems are reset. During this reset, however, the image is no longer present in the service processor 108 and the boot sequence reverts back to the partition boot sequence. When the partition comes up, the firmware update is distributed in the firmware of each node 101 on system 100. Significantly, this update is accomplished without reconfiguration of each node as an individual system and "manually" updating each system's firmware.

It will be apparent to those skilled in the art having the benefit of this disclosure that the present invention contemplates a method and system for achieving distributed firmware update in a merged system configuration. It is understood that the form of the invention shown and described in the detailed description and the drawings are to be taken merely as presently preferred examples. It is intended that the following claims be interpreted broadly to embrace all the variations of the preferred embodiments disclosed.

What is claimed is:

1. A method of updating firmware in a multiple node, data processing partition comprising a boot node and a second node wherein the boot node and the second node share a common set of resources, the method comprising:

providing firmware update code to the boot node;

creating an executable image of the firmware update code on the boot node;

distributing the image to a second node of the system, wherein distributing the image to the second node comprises transferring the image from system memory of the boot node directly to service processor adapters of the boot and second nodes;

causing a reset of the second node;

and as part of the second node boot sequence following the reset, determining that a firmware update image is present and, responsive thereto, booting the firmware update image to update the second node firmware.

2. The method of claim 1, further comprising, following the firmware update, performing a partition boot sequence to configure the boot and second nodes as a single partition, wherein the flash update of the second node occurs while maintaining the partition configuration.

3. The method of claim 1, wherein providing the firmware updated code comprises inserting a removable media into a disk drive of the boot node and wherein creating an executable image comprises creating an uncompressed image of the firmware update code in system memory of the boot node.

4. The method of claim 1, wherein distributing the image to a second node comprises transferring the image from system memory of the boot node to a service processor adapter of the boot node and transferring the image from the boot node service processor adapter to a second node service processor adapter.

5. The method of claim 4, wherein causing a reset of the second node is further characterized as causing a reset with the service processor adapter.

6. The method of claim 4, wherein determining that the firmware update image is present is further characterized as determining that the second node service processor adapter contains the image.

7. The method of claim 1, wherein booting the firmware update comprises transferring the image from a second node service processor adapter to second node system memory and modifying a disk interrupt handler to read from system memory.

8. A computer program product comprising computer executable code for updating firmware on multiple nodes of a data processing partition, the code being stored on a computer readable medium, comprising:

code means for creating an executable firmware update image on a boot node of the data processing system;

code means for distributing the image from the boot node to service processor adapters on the boot and second nodes of the system;

code means for causing the boot and second nodes to boot and, as a portion of their boot sequences, determining the presence of the image on their respective service processor adapters;

and code means for transferring the image to its system memory and booting the image directly from system memory to update its firmware responsive to each node determining the presence of the image on its service processor adapter.

9. The computer program product of claim 8, further comprising, following the firmware update, performing a partition boot sequence to configure the system as a partition comprising the merged processing, memory, and I/O resources of each node.

10. The computer program product of claim 8, wherein distributing the image from the boot node is further characterized as passing the image from the boot node system memory to the boot node service processor adapter and then transferring the image from the boot node service processor adapter to the second node service processor adapter.

11. The computer program product of claim 8, wherein causing the boot and second nodes to boot is further characterized as causing a power reset on the boot and second nodes while maintaining power to the service processor adapters.

12. The computer program product of claim 8, wherein creating the executable firmware update image comprises decompressing firmware update code stored on a removable media.

13. The computer program product of claim 8, wherein transferring the image to system memory is further characterized as performing a direct memory access with the service processor adapter and wherein booting the image directly from system memory includes modifying a disk interrupt handler to read from system memory.

14. A method of programming firmware in a data processing system comprising a boot node and a second node, comprising:

creating an executable firmware update image on a boot node of the data processing system;

distributing the image from the boot node to service processor adapters on the boot and second nodes of the system;

causing the boot and second nodes to boot and, as a portion of their boot sequences, determining the presence of the image on their respective service processor adapters;

and responsive to each node determining the presence of the image on its service processor adapter, transferring the image to its system memory and booting the image directly from system memory to update its firmware.

15. The method of claim 14, further comprising, following the firmware update, performing a partition boot sequence to configure the system as a partition comprising the merged processing, memory, and I/O resources of each node.

16. The method of claim 14, wherein distributing the image from the boot node is further characterized as passing the image from the boot node system memory to the boot node service processor adapter and then transferring the image from the boot node service processor adapter to the second node service processor adapter.

17. The method of claim 14, wherein causing the boot and second nodes to boot is further characterized as causing a power reset on the boot and second nodes while maintaining power to the service processor adapters.

18. The method of claim 14, wherein creating the executable firmware update image comprises decompressing firmware update code stored on a removable media.

19. The method of claim 14, wherein transferring the image to system memory is further characterized as performing a direct memory access with the service processor adapter and wherein booting the image directly from system memory includes modifying a disk interrupt handler to read from system memory.

20. A multi-node data processing system, comprising:

a first node and a second node configured as a data processing partition, wherein processing, memory, and I/O resources of the first and second nodes are shared under a single operating system image;

and means for using firmware update code provided to a single node of the partition to update the firmware of each of the nodes, wherein the firmware update process leaves the system in the partition configuration, wherein the firmware update code comprises:

code means for creating an executable firmware update image on the first node of the data processing system;

code means for distributing the image from the first node to service processor adapters on the first and second nodes of the system;

code means for causing the first and second nodes to boot and, as a portion of their boot sequences, determining the presence of the image on their respective service process adapters; and code means for transferring the image to its system memory and booting the image directly from system memory to update its firmware responsive to each node determining the presence of the image on its service processor adapter.

* * * * *